United States Patent
Kim et al.

(10) Patent No.: US 9,577,554 B2
(45) Date of Patent: Feb. 21, 2017

(54) MULTI-MOTOR DRIVING DEVICE AND APPARATUS AND METHOD OF DRIVING MOTOR FOR WASHING MACHINE USING SAME

(71) Applicant: AMOTECH CO., LTD., Incheon (KR)

(72) Inventors: Byung Soo Kim, Anyang-si (KR); Hyung Hwan Ko, Anseong-si (KR)

(73) Assignee: AMOTECH CO., LTD. (KR)

( * ) Notice: Subject to any disclaimer, the term of this patent is extended or adjusted under 35 U.S.C. 154(b) by 0 days.

(21) Appl. No.: 14/798,694

(22) Filed: Jul. 14, 2015

(65) Prior Publication Data
US 2015/0318805 A1  Nov. 5, 2015

Related U.S. Application Data

(62) Division of application No. PCT/KR2014/000545, filed on Jan. 20, 2014.

(30) Foreign Application Priority Data

Jan. 21, 2013 (KR) .................. 10-2013-0006671
Jul. 19, 2013 (KR) .................. 10-2013-0085532
Oct. 2, 2013 (KR) .................. 10-2013-0118046

(51) Int. Cl.
*H02P 3/00* (2006.01)
*H02P 6/00* (2016.01)
(Continued)

(52) U.S. Cl.
CPC ............. *H02P 6/002* (2013.01); *D06F 37/304* (2013.01); *D06F 37/306* (2013.01); *D06F 37/40* (2013.01);
(Continued)

(58) Field of Classification Search
CPC ..... H02P 21/06; H02P 21/146; H02P 23/0045; H02P 27/02; H02M 7/53875
(Continued)

(56) References Cited

U.S. PATENT DOCUMENTS 5,038,065 A * 8/1991 Matsubayashi ........ H02K 29/08
310/156.15
5,783,893 A * 7/1998 Dade ...................... H02K 16/00
310/114
(Continued)

FOREIGN PATENT DOCUMENTS

JP 07255988 10/1995
JP 08172757 7/1996
(Continued)

OTHER PUBLICATIONS

International Search Report—PCT/KR2014/000545 dated May 23, 2014.

*Primary Examiner* — Rina Duda
(74) *Attorney, Agent, or Firm* — Cantor Colburn LLP

(57) ABSTRACT

A motor driving apparatus for a washing machine, in which a motor is a washing machine motor with a double stator and a double rotor respectively having first and second U-phase, V-phase, and W-phase stator coils, includes: a motor controller for generating a drive signal in accordance with a washing mode, a rinsing mode and a dewatering mode; an inverter for generating a three-phase alternating-current (AC) power, in which any one-phase AC power of the three-phase AC power is applied in common to any one-phase stator coil of the first and second U-phase, V-phase, and W-phase stator coils for the washing machine motor; and a switching unit for switching to apply the remaining two-phase AC power of the three-phase AC power to any two-phase stator coils of the remaining two-phase stator
(Continued)

coils of the first and second U-phase, V-phase, and W-phase stator coils for the washing machine motor.

15 Claims, 11 Drawing Sheets

(51) Int. Cl.
    *H02P 5/74*     (2006.01)
    *H02K 7/08*     (2006.01)
    *D06F 37/40*     (2006.01)
    *D06F 37/30*     (2006.01)
    *H02K 7/116*     (2006.01)
    *H02K 1/14*     (2006.01)
    *H02K 16/00*     (2006.01)
    *H02K 21/12*     (2006.01)

(52) U.S. Cl.
    CPC .............. *H02K 1/148* (2013.01); *H02K 7/083* (2013.01); *H02K 7/116* (2013.01); *H02K 16/00* (2013.01); *H02P 5/74* (2013.01); *H02K 21/12* (2013.01); *H02K 2213/06* (2013.01); *Y02B 40/52* (2013.01)

(58) Field of Classification Search
    USPC ................................. 318/798, 800, 801, 461
    See application file for complete search history.

(56) References Cited

U.S. PATENT DOCUMENTS

| | | | | |
|---|---|---|---|---|
| 5,931,029 A * | 8/1999 | Kim | ........................ | D06F 17/06 68/133 |
| 6,257,027 B1 * | 7/2001 | Imai | ...................... | D06F 37/304 68/12.12 |
| 7,557,486 B2 * | 7/2009 | Choi | ...................... | D06F 37/304 310/154.33 |
| 7,911,110 B2 * | 3/2011 | Choi | ...................... | D06F 37/304 310/114 |
| 7,923,879 B2 * | 4/2011 | Nitta | .................... | H02K 1/2786 310/156.44 |

FOREIGN PATENT DOCUMENTS

| | | |
|---|---|---|
| JP | 2011239515 | 11/2011 |
| KR | 1020030062556 | 7/2003 |
| KR | 1020110139434 | 12/2011 |

* cited by examiner

MULTI-MOTOR DRIVING DEVICE AND APPARATUS AND METHOD OF DRIVING MOTOR FOR WASHING MACHINE USING SAME

CROSS REFERENCE TO RELATED APPLICATIONS

This application is a divisional of International Application No. PCT/KR2014/000545, filed on Jan. 20, 2014, which claims priority to and the benefit of Korean Application Nos. 10-2013-0006671 filed on Jan. 21, 2013; 10-2013-0085532 filed on Jul. 19, 2013; and 10-2013-0118046 filed on Oct. 2, 2013, in the Korean Patent Office, the entire contents of which are incorporated herein by reference.

TECHNICAL FIELD

The present invention relates to a multi-motor driving device for selectively driving a multi-motor with only one inverter and an apparatus for and a method of driving a motor for a washing machine using the same.

BACKGROUND ART

In general, a motor driving circuit is configured by using a plurality of inverters when driving a plurality of motors. In particular, a plurality of inverters have been conventionally used even in the case of selectively driving one of a plurality of motors, to accordingly cause a factor that a drive circuit becomes complicated and the cost increases.

In addition, a general direct-coupled type washing machine selectively rotates a pulsator and a dewatering tub by using a motor for a washing machine.

For example, a washing machine rotates the pulsator repeatedly forward and backward in the case of performing a washing operation and a rinsing operation of washes, and rotates the pulsator and the dewatering tub at high-speed in an identical direction with the washing machine motor in the case of performing a dewatering operation.

In order to be able to rotate only the pulsator or the pulsator and the dewatering tub together with the washing machine motor, a conventional direct-coupled type washing machine are provided with a clutch and a transmission (see Korean Patent Registration Publication No. 10-0438616).

The clutch transmits rotational torque of the washing machine motor to the axis of rotation of the pulsator to thus have only the pulsator rotated, or transmits rotational torque of the washing machine motor to the axis of rotation of the pulsator and the axis of rotation of the dewatering tub to thus have the pulsator and the dewatering tub rotated together at high-speed.

However, the clutch includes a coupling, a coupling lift lever, a lift lever driving portion, and the like, and controls a planetary gear type reduction gear comprising a sun gear, a planetary gear, a carrier, etc., for transmitting the rotational force of a rotor to the pulsator during washing, to accordingly cause a factor that the configuration is very complicated, large and expensive, and the manufacturing cost of the washing machine increases.

Further, the conventional washing machine has a structure that the pulsator and the dewatering tub can rotate only in the same direction. Accordingly, the pulsator and the dewatering tub cannot rotate in opposite directions to each other, to thus cause a limit to improving performance of the washing machine.

Meanwhile, a conventional full-automatic washing machine that does not use a planetary gear type reduction gear has been proposed, but a large-capacity washing machine requiring a large torque adopting such a conventional full-automatic washing machine has caused a problem of taking a long washing time and deteriorating the washing efficiency.

SUMMARY OF THE INVENTION

To solve the above problems or defects, it is an object of the present invention to provide a multi-motor driving device for selectively a multi-motor with only one inverter, and an apparatus for and a method of driving a motor for a washing machines using the same.

In addition, it is another object of the present invention to provide a multi-motor driving device in which one-phase is commonly connected and only two-phases are switched in a three-phase driving system, to thus apply an AC (alternating-current) power to first and second stator coils, to thereby reduce one relay device, and an apparatus for and a method of driving a motor for a washing machines using the same.

In addition, it is still another object of the present invention to provide a multi-motor driving device that performs a washing mode, a rinsing mode, and a dewatering mode while selectively rotating a pulsator and a dewatering tank, by using a motor for a washing machine including a double stator and a double rotor without using a separate clutch, and an apparatus for and a method of driving a motor for a washing machines using the same.

In addition, it is yet another object of the present invention to provide a multi-motor driving device that can implement a high-capacity washing machine requiring a large torque in a washing mode, by connecting one of dual outputs of a double rotor to a pulsator through an inner shaft of a planetary gear unit to increase the torque, and the other of the dual outputs thereof to a dewatering tub through a case (or a ring gear) of the planetary gear unit, without using a separate clutch, and an apparatus for and a method of driving a motor for a washing machines using the same.

Further, it is still yet another object of the present invention to provide a multi-motor driving device for selectively rotating a pulsator and a dewatering tub by using a single inverter, and an apparatus for and a method of driving a motor for a washing machines using the same.

The objects of solving the technical problems of the present invention are not limited to the objects of solving the above-mentioned problems, and it will be clearly understood from the following description by one of ordinary skill in the art that there will be other objects of the present invention.

To accomplish the above and other objects of the present invention, according to an aspect of the present invention, there is provided a motor driving apparatus for a washing machine, in which a motor is a washing machine motor with a double stator and a double rotor respectively having first and second U-phase, V-phase, and W-phase stator coils, the washing machine motor driving apparatus comprising: a motor controller for generating a drive signal in accordance with a washing mode, a rinsing mode and a dewatering mode, thereby controlling the driving of the motor for the washing machine; an inverter for generating a three-phase alternating-current (AC) power according to the drive signal, in which any one-phase AC power of the three-phase AC power is applied in common to any one-phase stator coil of the first and second U-phase, V-phase, and W-phase stator coils for the washing machine motor; and a switching unit for switching to apply the remaining two-phase AC power of the three-phase AC power to any two-phase stator coils of the remaining two-phase stator coils of the first and second U-phase, V-phase, and W-phase stator coils for the washing machine motor, according to the control of the motor controller.

Preferably but not necessarily, the switching unit comprises: a transistor that is switched according to the control of the motor controller; a relay coil that is activated or deactivated depending on the switching of the transistor; and a relay switch for switching to apply the two-phase AC power to the two-phase stator coils of the first U-phase, V-phase, and W-phase stator coils for the washing machine motor, or the two-phase stator coils of the second U-phase, V-phase, and W-phase stator coils for the washing machine motor, depending on the activation or deactivation of the relay coil.

Preferably but not necessarily, the double rotor comprises: an inner rotor that is connected to a dewatering tub rotary shaft for driving a dewatering tub and is rotated together; and an outer rotor that is connected to a pulsator rotating shaft for driving a pulsator and that is rotated together, and the double stator that is arranged with an air gap from each of the inner rotor and the outer rotor between the inner rotor and the outer rotor comprises: an outer stator including first U-phase, V-phase, and W-phase stator coils that interact with the outer rotor to thus form a first outer magnetic circuit; and an inner stator including second U-phase, V-phase, and W-phase stator coils that interact with the inner rotor to thus form a second outer magnetic circuit.

Preferably but not necessarily, in the event of generating washing and rinsing mode drive signals from the motor controller, the switching unit switches to apply the two-phase AC power of the three-phase AC power to the two-phase stator coils of the first U-phase, V-phase, and W-phase stator coils, and in the event of generating a dewatering mode drive signal from the motor controller, the switching unit switches to apply the two-phase AC power of the three-phase AC power to the two-phase stator coils of the second U-phase, V-phase, and W-phase stator coils.

Preferably but not necessarily, the double stator comprises a plurality of split core assemblies, in which each of the plurality of split core assemblies comprises: a split core in which outer teeth are formed on an outer side of the split core, and inner teeth are formed on an inner side thereof, and that is assembled with adjacent split cores by a back yoke connecting the outer teeth and the inner teeth in an annular form; an insulator bobbin surrounding the outer surface of the split core; first U-phase, V-phase, and W-phase stator coils wound on the outer teeth; and second U-phase, V-phase, and W-phase stator coils wound on the inner teeth.

Preferably but not necessarily, the washing machine motor comprises: the double rotor having an inner rotor and an outer rotor; and the double stator with an air gap disposed from each of the inner rotor and the outer rotor between the inner rotor and the outer rotor, and the washing machine motor driving device further comprises a planetary gear unit that reduces the rotational speed of the outer rotor and transmits the reduced rotational speed of the outer rotor to the pulsator at the washing and rinsing modes, and transmits the rotational speed of the inner rotor to the dewatering tub at the dewatering mode without reducing the rotational speed of the inner rotor.

Preferably but not necessarily, the washing machine motor driving apparatus further comprises: a first inner shaft for transmitting the rotational force of the outer rotor to a sun gear of the planetary gear unit; a first outer shaft for transmitting the rotational force of the inner rotor to a ring gear of the planetary gear unit; a second inner shaft for transmitting the output of a carrier of the planetary gear unit to the pulsator; and a second outer shaft for transmitting the output of the ring gear of the planetary gear unit to the dewatering tub.

Preferably but not necessarily, the planetary gear unit comprises: a ring gear connecting between a first outer shaft and a second outer shaft; a sun gear connected to the first inner shaft; a plurality of planetary gears that are engaged with an outer surface of the sun gear and an inner surface of the ring gear; and a carrier to which the planetary gears are rotatably supported and that is connected to the second inner shaft.

Preferably but not necessarily, a first bearing is supported on the outer surface of the first outer shaft and a second bearing is supported on the outer surface of the second outer shaft, wherein the first bearing is fixed to a first bearing housing and the second bearing is fixed to a second bearing housing.

Preferably but not necessarily, the first bearing housing comprises: a first bearing mounting portion on which the first bearing is mounted; a cover portion that is externally extended from the first bearing mounting portion to thus form a cylindrical shape, and that is disposed to be wrapped with a certain gap on the outer surface of the planetary gear unit, to thus protect the planetary gear unit; and a first flat plate portion that is externally extended from the top of the cover portion to thus form a circular plate shape, and on which the double stator and the dewatering tub are fixed.

Preferably but not necessarily, the second bearing housing comprises: a second bearing mounting portion on which the second bearing is mounted; a second seal fixing portion that is externally extended from the second bearing mounting portion and on which a second seal is fixed; a connection portion that is bent downwards from the second seal fixing portion, to thus form a cylindrical shape; and a second flat plate portion that is externally extended from the bottom of the connection portion and is overlapped with the first flat plate portion.

According to another aspect of the present invention, there is provided a method of driving a motor for a washing machine, in which the washing machine motor comprising a double stator and a double rotor respectively having first and second U-phase, V-phase, and W-phase stator coils, the motor driving method comprising the steps of: judging an operation mode based on a control signal by a motor controller; controlling a three-phase alternating-current (AC) power generated from an inverter to be output to the first U-phase, V-phase, and W-phase stator coils in the case that the judged operation mode is a washing mode or rinsing mode, to thus make an outer rotor of the double rotor rotated to thereby make a pulsator rotated; and controlling the three-phase AC power generated from the inverter to be output to the second U-phase, V-phase, and W-phase stator coils in the case that the judged operation mode is a dewatering mode, to thus make an inner rotor of the double rotor rotated to thereby make a dewatering tub rotated.

Preferably but not necessarily, the motor controller controls a switching unit to apply the two-phase AC power of the three-phase AC power to one selected from the first and second U-phase, V-phase, and W-phase stator coils, when the three-phase alternating-current (AC) power generated from the inverter is selectively applied to one selected from the first and second U-phase, V-phase, and W-phase stator coils.

Preferably but not necessarily, the step of making an inner rotor of the double rotor rotated to thereby make a dewatering tub rotated, further comprises the step of transmitting the rotational speed of the inner rotor to the dewatering tub without speed reduction through a ring gear of a planetary gear unit.

Preferably but not necessarily, the step of making an outer rotor of the double rotor rotated to thereby make a pulsator rotated, further comprises the step of transmitting the rotational speed of the outer rotor to the pulsator with speed reduction through the planetary gear unit.

According to another aspect of the present invention, there is provided a multi-motor driving device in which a multi-motor comprises a first motor having a first stator and a first rotor in which the first stator includes first U-phase, V-phase, and W-phase stator coils, and a second motor having a second stator and a second rotor in which the second stator includes second U-phase, V-phase, and W-phase stator coils, the multi-motor driving device comprising: a motor controller that generates driving signals for controlling the drive of the first and second motors; an inverter that generates a three-phase alternating-current (AC) power according to the driving signals, and applies any one-phase AC power in common to any one-phase stator coil of first U-phase, V-phase, and W-phase stator coils of the first motor and second U-phase, V-phase, and W-phase stator coils of the second motor; and a switching unit for switching to apply the remaining two-phase AC power of the three-phase AC power to any two-phase stator coils of the remaining two-phase stator coils of the first and second U-phase, V-phase, and W-phase stator coils for the first and second motors, according to the control of the motor controller.

According to another aspect of the present invention, there is provided a method of driving a multi-motor in which a multi-motor comprises a first motor having a first stator and a first rotor in which the first stator includes first U-phase, V-phase, and W-phase stator coils, and a second motor having a second stator and a second rotor in which the second stator includes second U-phase, V-phase, and W-phase stator coils, the multi-motor driving method comprising the steps of: generating first and second control signals from a motor controller; controlling a three-phase alternating-current (AC) power generated from an inverter to be output to the first U-phase, V-phase, and W-phase stator coils, in response to the first control signal, to thus rotate the first rotor of the first motor; and controlling the three-phase AC power generated from the inverter to be output to the second U-phase, V-phase, and W-phase stator coils, in response to the second control signal, to thus rotate the second rotor of the second motor.

According to another aspect of the present invention, there is provided a multi-motor driving device that three-phase drives a plurality of motors that are connected in parallel to each other, the multi-motor driving device comprising: a motor controller for generating drive signals to thus control driving of the plurality of motors; an inverter that generates a three-phase alternating-current (AC) power according to the drive signals, in which any one-phase AC power of the three-phase AC power is applied in common to any one-phase coil of the plurality of motors; and a switching unit for switching to apply the remaining two-phase AC power of the three-phase AC power to any two-phase stator coils of the plurality of motors, according to the control of the motor controller.

As described above, in the present invention, only a single inverter can be used to selectively drive multi-motors.

In the present invention, a motor driving apparatus for a washing machine is applied without using a separate clutch, and a washing machine motor having a double stator and a double rotor is selectively driven by using only a single inverter, to thereby reduce a production cost of a washing machine.

In this case, one phase of three phases is connected in common and only two phases thereof are switched in a three-phase drive system, to thereby apply an alternating-current (AC) power to first or second stator coils to thus reduce a relay device.

In addition, in the present invention, without using a separate clutch, a washing machine motor having a double stator and a double rotor is driven by using a motor driving apparatus for a washing machine, to thereby selectively rotate a pulsator and a dewatering tub to thus perform operations of a washing mode, a rinsing mode, and a dewatering mode.

In the present invention, a washing machine motor having a double stator and a double rotor enables one of dual outputs of a double rotor to be connected to a pulsator through an inner shaft of a planetary gear unit to increase the torque, and the other of the dual outputs thereof to be connected to a dewatering tub through a case (or a ring gear) of the planetary gear unit, without using a separate clutch, to thereby implement a high-capacity washing machine requiring a large torque in a washing mode.

DESCRIPTION OF DRAWINGS

Hereinafter, the present invention will be described in detail by explaining exemplary embodiments of the invention with reference to the attached drawings. Like reference numerals in the drawings denote like elements.

DETAILED DESCRIPTION OF THE INVENTION

Hereinafter, the following detailed description is nothing but an example, but merely shows an embodiment of the present invention. Principles and concepts of the present invention are provided for the purpose of the most useful and easy explanation.

Therefore, a detailed architecture more than necessary for a basic understanding of the present invention is not provided, but a number of forms that can be embodied in the substance of the present invention by those skilled in the art will be illustrated with reference to the drawings.

First, a motor for a washing machine of a double rotor and double stator structure according to the present invention will be described in detail, before explaining a motor driving apparatus for a washing machine according to the invention.

Figure 1:
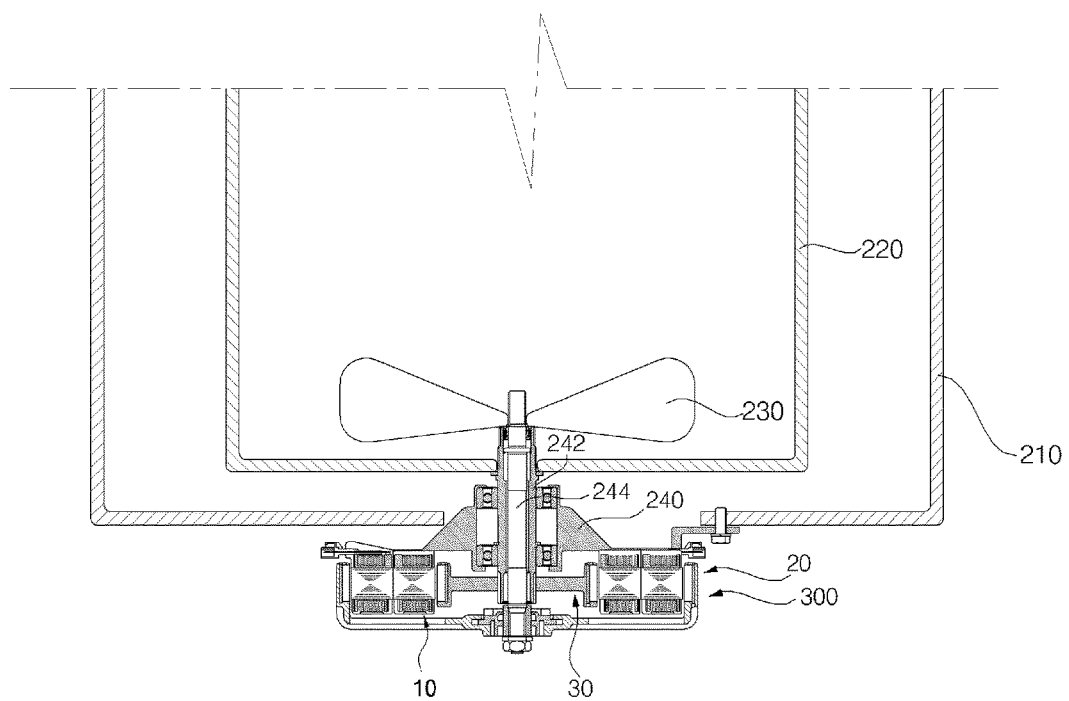
FIG. 1 is a cross-sectional view of a motor driving apparatus for a washing machine according to a first embodiment of the present invention.
Figure 2:
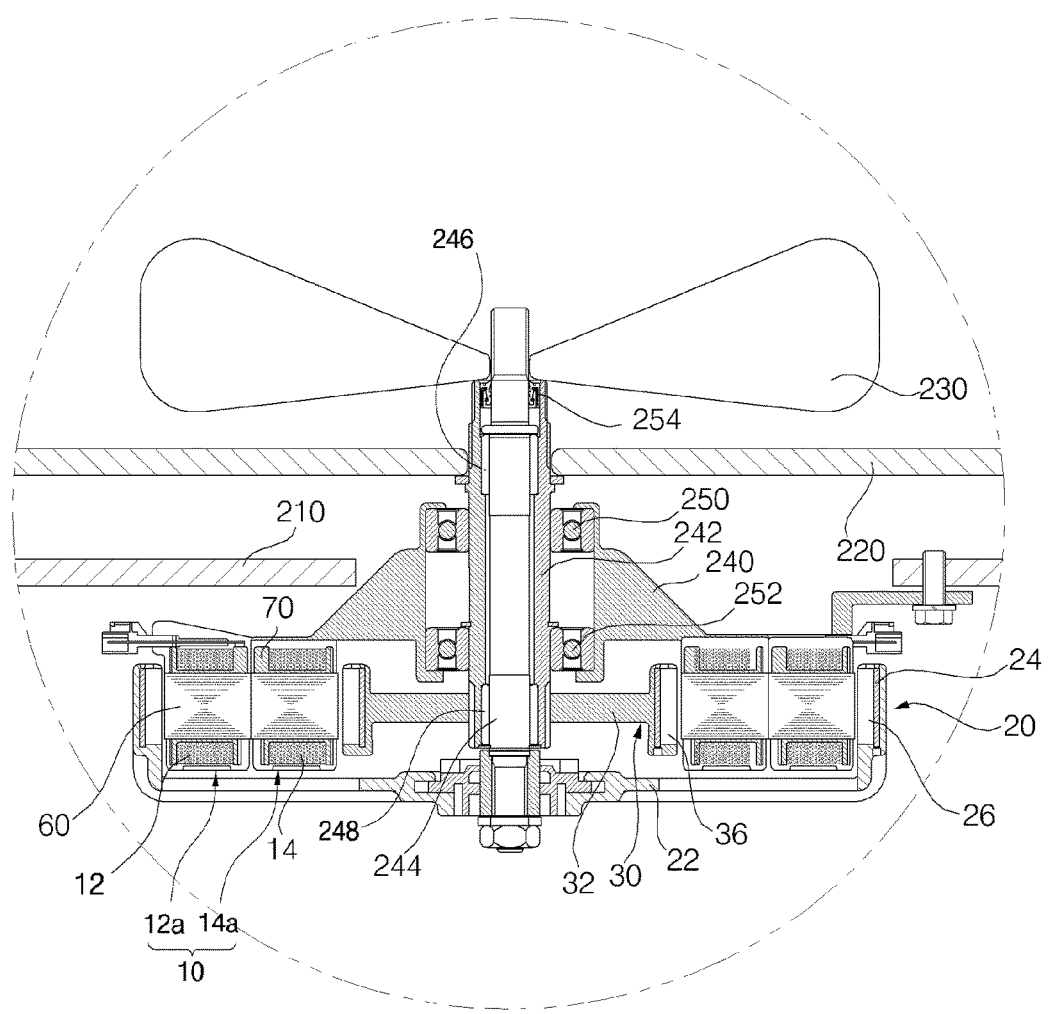
FIG. 2 is a cross-sectional view of a motor for a washing machine in which a motor driving apparatus for the washing machine is applied according to an embodiment of the present invention.
Figure 3:
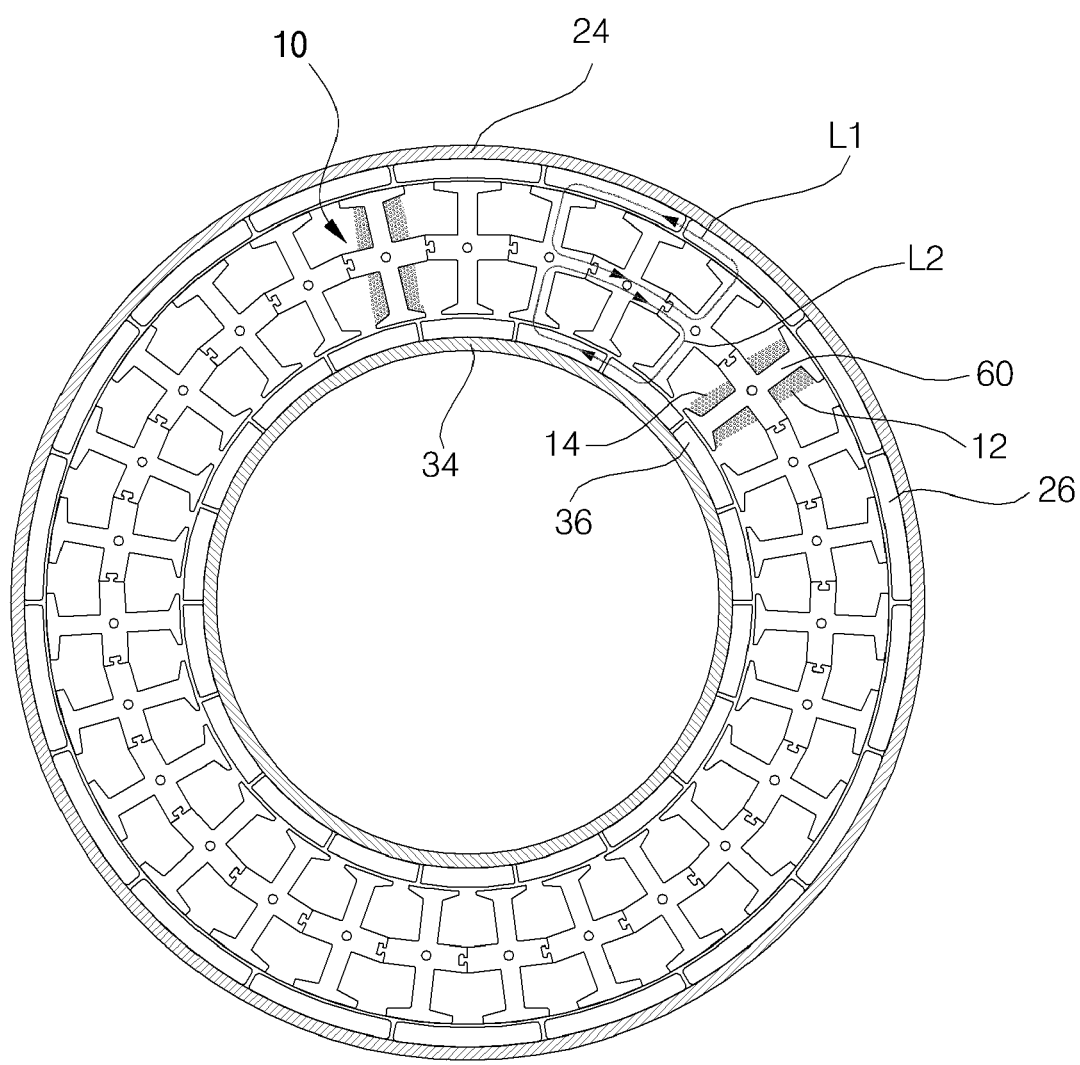
FIG. 3 is a plan view of a motor for a washing machine in which a motor driving apparatus for the washing machine is applied according to an embodiment of the present invention.

FIG. 1 is a cross-sectional view of a motor driving device for a washing machine according to a first embodiment of the present invention. FIG. 2 is a cross-sectional view of a motor for a washing machine in which a motor driving device for the washing machine is applied according to an embodiment of the present invention. FIG. 3 is a plan view of a motor for a washing machine in which a motor driving device for the washing machine is applied according to an embodiment of the present invention.

Referring to FIGS. 1 to 3, a washing machine in which a washing machine motor driving device according to an embodiment of the present invention is applied, includes: a washing tub 210 that is suspended in the inside of a case (not shown) forming an outer appearance and accommodates laundry water; a dewatering tub 220 that is rotatably disposed in the inside of the washing tub 210, to thus perform a laundry operation, a rinsing operation, and a dewatering operation; a pulsator 230 that is rotatably disposed in the inside of the dewatering tub 220, to thus form a laundry water stream; and a motor 300 that is provided in the lower portion of the washing tub 210, to thus selectively rotate the dewatering tub 220 and the pulsator 230.

A support member 240 is fixed below the washing tub 210, and a dewatering tub rotating shaft 242 that is connected to the dewatering tub 220 to rotate the dewatering tub 220 is rotatably supported to the support member 240. In addition, a pulsator rotating shaft 244 that is connected to the pulsator 230 to rotate the pulsator 230 is rotatably disposed in a coaxial structure in the inside of the dewatering tub rotating shaft 242.

The washing machine motor 300 includes: a double stator 10 that is fixed below the washing tub 210; an outer rotor 20 that is positioned with a certain gap on the outer surface of the double stator 10 and is connected to the pulsator rotating shaft 244; and an inner rotor 30 that is positioned with a certain gap on the inner surface of the double stator 10 and is connected to the dewatering tub rotating shaft 242.

The dewatering tub rotating shaft 242 is formed in a hollow form. The upper portion of the dewatering tub rotating shaft 242 is fixed to the dewatering tub 220. The central portion of the dewatering tub rotating shaft 242 is rotatably supported to the support member 240 through bearings 250 and 252 placed between the dewatering tub rotating shaft 242 and the support member 240. The lower portion of the dewatering tub rotating shaft 242 is spline-combined or serration-combined with the inner rotor 30, so that the dewatering tub rotating shaft 242 is rotated together with rotation of the inner rotor 30.

The pulsator rotating shaft 244 is rotatably supported to the inner portion of the dewatering tub rotating shaft 242 through a pair of sleeve bearings 246 and 248. The upper portion of the pulsator rotating shaft 244 is fixed to the pulsator 230. The lower portion of the pulsator 230 is spline-combined or serration-combined with the outer rotor 20, so that the pulsator rotating shaft 244 is rotated together with rotation of the outer rotor 20.

The pair of sleeve bearings 246 and 248 are inserted between the dewatering tub rotating shaft 242 and the pulsator rotating shaft 244, at the upper and lower sides thereof, to thus rotatably support the pulsator rotating shaft 244. A sealing member 254 is provided at a leading end between the dewatering tub rotating shaft 242 and the pulsator rotating shaft 244, which are positioned at the inside of the dewatering tub 220, to thus prevent laundry water filled in the dewatering tub 220 from leaking.

The outer rotor 20 includes: a first rotor support 22; a first back yoke 24 that is fixed to one side of the first rotor support 22; and a first magnet 26 that is fixed on the inner surface of the first back yoke 24 and is disposed with a certain gap opposite the outer surface of the double stator 10.

The outer rotor 20 is configured by aligning the first back yoke 24 and the first magnet 26 in an annular form in a mold and then integrally molding the first rotor support 22 by an insert-molding method.

The back yoke 24 and the first magnet 26 are fixed to one side of the first rotor support 22 and the other side of the first rotor support 22 is spline-combined or serration-combined with the pulsator rotating shaft 244.

The inner rotor 30 includes: a second rotor support 32; a second annular back yoke 34 that is fixed to the outer surface of the second rotor support 32; and a second magnet 36 that is fixed to the outer surface of the second back yoke 34 and is disposed with a certain gap opposite the inner surface of the double stator 10.

The inner rotor 30 is configured by aligning the second back yoke 34 and the second magnets 36 in an annular form in a mold and then integrally molding the second rotor support 32 by an insert-molding method.

The second rotor support 32 is formed in the form of a disc whose central portion is open. The second back yoke 34 and the second magnet 36 are fixed on the outer surface of the second rotor support 32. The inner surface of the second rotor support 32 is spline-combined or serration-combined with the dewatering tub rotating shaft 242.

As described above, the pulsator rotating shaft 244 is connected with the outer rotor 20, and thus is rotated together with rotation of the outer rotor 20, and the dewatering tub rotating shaft 242 is connected with the inner rotor 30, and thus is rotated together with rotation of the inner rotor 30. As a result, the pulsator rotating shaft 244 and the dewatering tub rotating shaft 242 are rotated separately or simultaneously.

Figure 5:
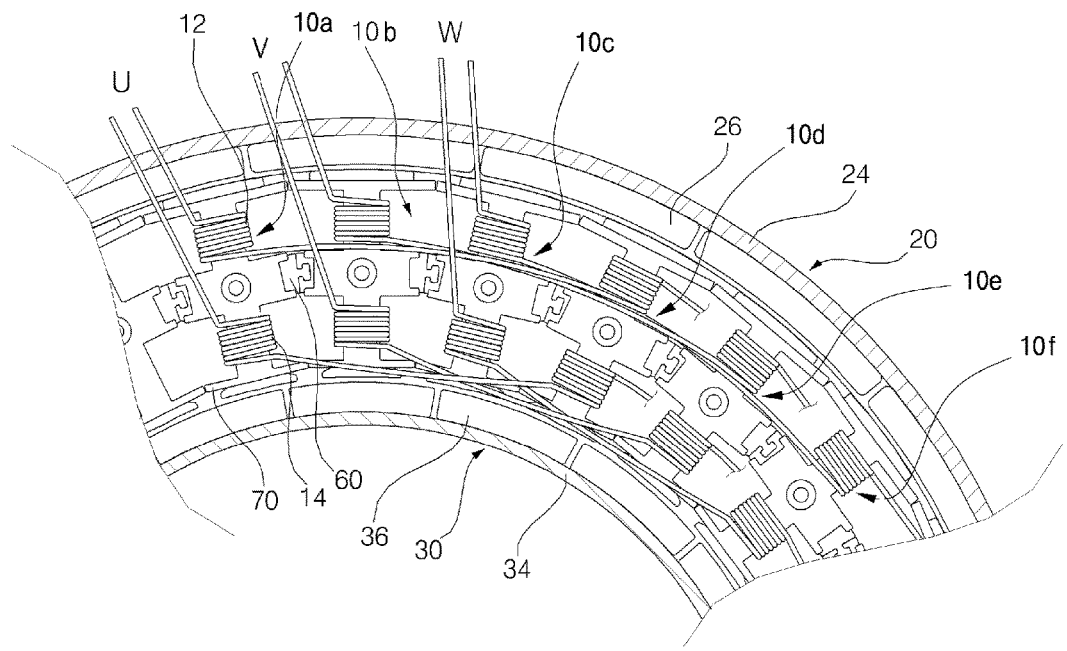
FIG. 5 is a side view illustrating a process of winding a coil on a split core of a motor for a washing machine in which a motor driving apparatus for a washing machine of the present invention is applied.

The double stator 10 includes: a number of split core assemblies 50 around which a first coil 12 and a second coil 14 are wound, as shown in FIG. 5.

As shown in FIG. 5, each of the split core assemblies 50 includes: a split core 60; an insulating bobbin 70 surrounding the outer surface of the split core 60; the first coil 12 that is wound on an outer side of the split core 60 and through which a first drive signal is applied in which the first drive signal is needed to rotationally drive the pulsator 230 through the outer rotor 20 and the pulsator rotating shaft 244 and connected with the pulsator rotating shaft 244; and the second coil 14 that is wound on an inner side of the split core 60 and through which a second drive signal is applied in which the second drive signal is needed to rotationally drive the dewatering tub 220 through the inner rotor 30 and the dewatering tub rotating shaft 242 and connected with the dewatering tub rotating shaft 242.

Here, since the first drive signal is applied to the first coil 12 and the second drive signal is applied to the second coil 14, the rotating torque of the pulsator 230 and the dewatering tub 220 may be designed to suit for the respective rotating forces thereof, to thus improve the efficiency of the motor.

Figure 4:
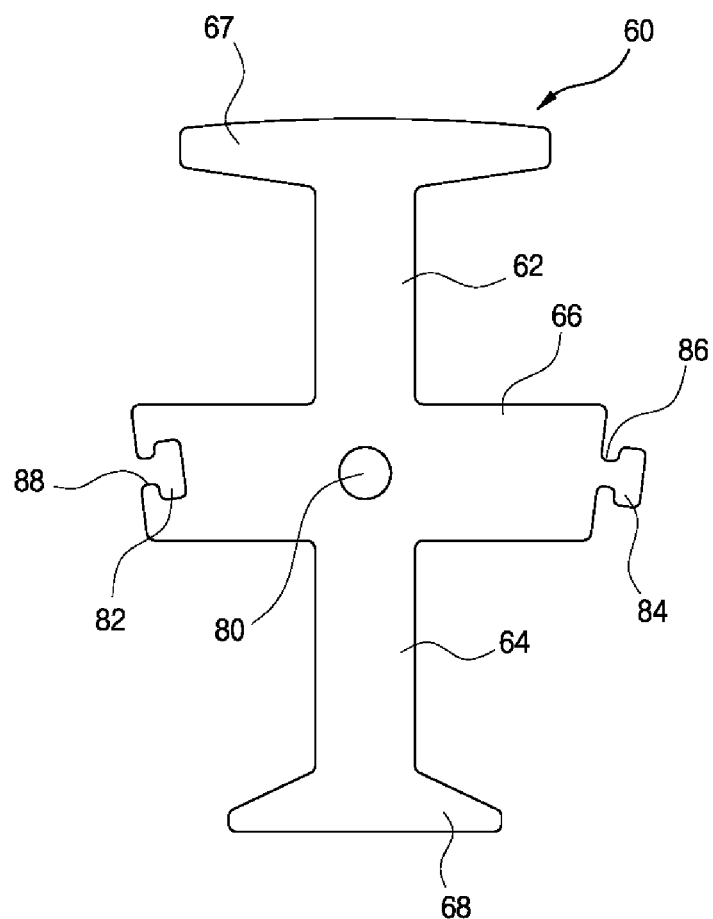
FIG. 4 is a plan view showing a split core of a stator for a motor for a washing machine shown in FIG. 3.

As shown in FIG. 4, the split core 60 includes: an outer tooth 62 around which the first coil 12 is wound; an inner tooth 64 that is formed on the opposite side of the outer tooth 62 and around which the second coil 14 is wound; a partition 66 that divides between the outer tooth 62 and the inner tooth 64; and connectors 82 and 84 that are formed at both ends of the partition 66, respectively, to thereby connect between the adjacent split cores 60 with each other.

The partition 66 and the connectors 82 and 84 constitute a back yoke forming a magnetic circuit passage.

A first extension portion 67 which is positioned facing the outer rotor 20 is formed at the end of the outer tooth 62, and a second extension portion 68 which is positioned facing the inner rotor 30 is formed at the end of the inner tooth 64.

In addition, a throughhole 80 is formed at the center of the split core 60, in order to tighten a plurality of laminated split cores 60 with a bolt between an upper fixed plate (not shown) and a lower fixed plate (not shown).

The first extension portion 67 and the second extension portion 68 are formed into an introverted surface and an extroverted surface of a predetermined curvature, respectively, so as to correspond to a first magnet 26 of the outer rotor 20 and a second magnet 36 of the inner rotor 30, respectively. Thus, the roundness of the inner and outer circumferences of the split core 60 increases, to thus make the inner and outer circumferences of the stator 10 approach the first magnet 26 and the second magnet 36, respectively, but to maintain even a constant magnetic gap.

The split cores 60 should be directly connected with each other so as to form a magnetic circuit between the split cores 60. Thus, the connectors 82 and 84 are formed in a structure of directly connecting between the split cores 60.

For example, the connectors 82 and 84 are formed into a coupling groove structure and a coupling protrusion structure, in which the connector 82 of the coupling groove structure is formed at one side of the partition 66 and the connector 84 of the coupling protrusion structure is formed at the other side of the partition 66, and thus the connector 84 is fitted into the connector 82. A narrow neck portion 86 is formed in the connector 84 of the coupling protrusion structure, and a narrow entrance portion 88 is formed in the connector 82 of the coupling groove structure, so that the neck portion 86 of the connector 84 is caught by the entrance portion 88 of the connector 82 of the coupling groove structure. The connectors 82 and 84 may employ other well-known structures in addition to the coupling of adopting the coupling protrusion 84 and the coupling groove 82.

As shown in FIG. 5, first, the winding of the double stator 10 is formed to surround a bobbin 70 on the outer peripheral surface of each of the split cores in which a plurality of the split cores are laminated to then execute an insert-molding operation.

Then, a coil winding process is performed for winding the first coil 12 on the outer tooth 62 of the split core 60 and simultaneously winding the second coil 14 on the inner tooth 62 of the split core 60. As a result, the double stator 10 of the present invention constitutes the outer stator 12a by winding the first coil 12 on the outer tooth 62 of the split core 60, and constitutes the inner stator 14a by winding the second coil 14 on the inner tooth 62 of the split core 60.

In addition, the outer stator 12a may be constituted by winding the first coil 12 wound on the outer tooth 62 in the clockwise (CW) direction, and the inner stator 14a may be constituted by winding the second coil 14 wound on the inner tooth 64 in the counterclockwise (CCW) direction.

When the winding directions of the first coil 12 and the second coil 14 are made opposite to each other as described above, it is possible to rotate the dewatering tub in the direction opposite to the rotating direction of the pulsator in the washing mode or rinsing mode of washing machine.

Further, in this case, in order to separately drive the first coil 12 for the outer stator 12a and the second coil 14 for the inner stator 14a, it is necessary to individually mount Hall elements required for detecting the rotational positions of the outer rotor 20 and the inner rotor 30.

In the case of the above-described washing machine motor 300, a first magnetic circuit L1 is formed between the outer rotor 20 and one side of the double stator 10 on which the first coil 12 is wound, that is, the outer stator, and a second magnetic circuit L2 is formed between the inner rotor 30 and the other side of the double stator 10 on which the second coil 14 is wound, that is, the inner stator, to thus form a pair of independent magnetic circuits to thereby make a magnetic path get shorter. As a result, a magnetoresistance is reduced, to thereby reduce the loss of a magnetic force and improve the efficiency of the motor.

Specifically, the first magnetic circuit L1 is formed so that a magnetic flux of the first magnetic circuit L1 passes an N-pole first magnet 26, an outer tooth 62 that faces the N-pole first magnet 26 and on which a first coil 12 is wound, an outer portion of a partition 66, an S-pole first magnet 26 adjacent to the N-pole first magnet 26, and a first back yoke 24.

In addition, the second magnetic circuit L2 is formed so that a magnetic flux of the second magnetic circuit L2 passes an N-pole second magnet 36, an inner tooth 64 that faces the N-pole second magnet 36 and on which a second coil 14 is wound, an inner portion of a partition 66, an S-pole second magnet 36 adjacent to the N-pole second magnet 36, and a second back yoke 34.

A motor driving apparatus for a washing machine using a motor of a double rotor-double stator structure will be described below.

Figure 6:
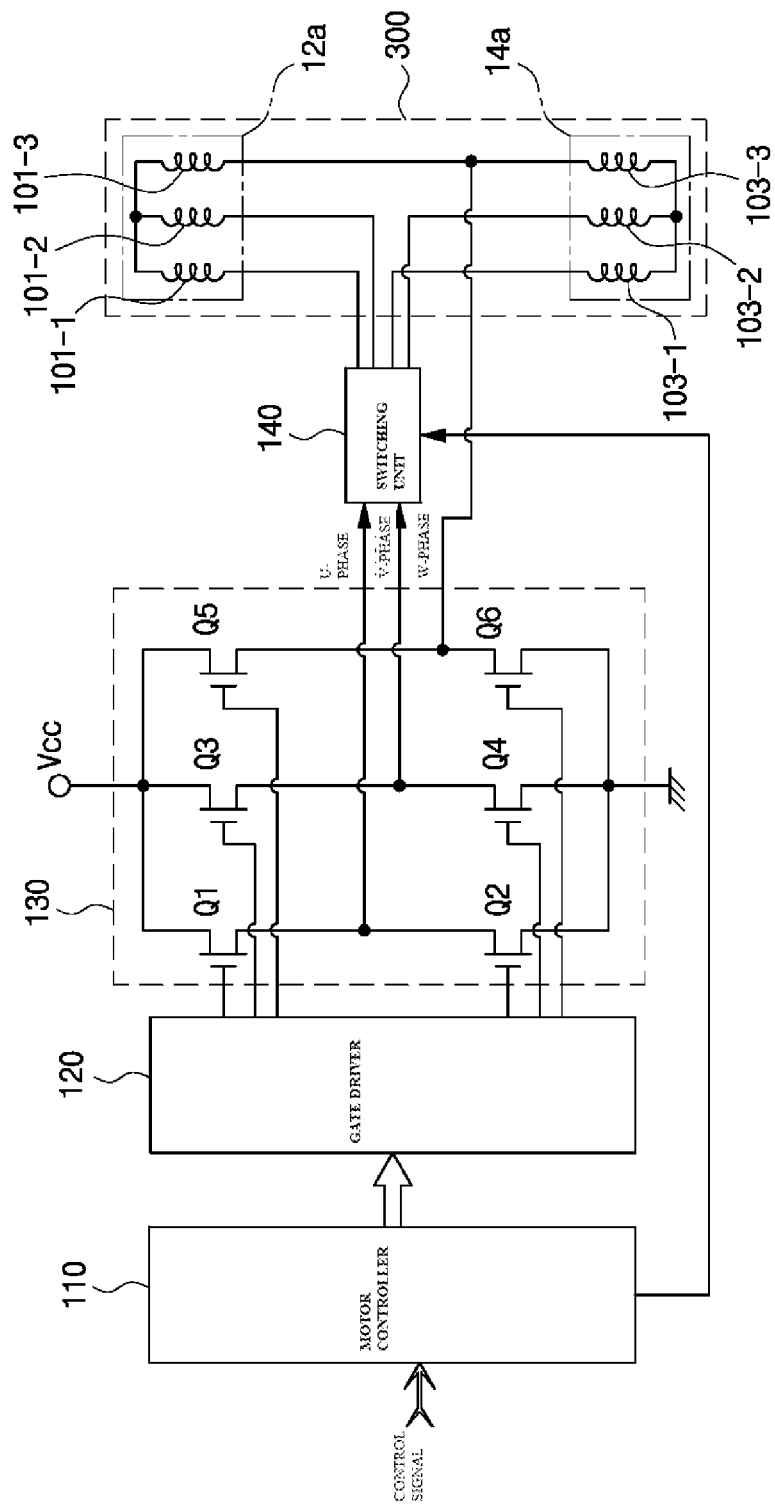
FIG. 6 is a block diagram showing a circuit configuration of a motor driving apparatus for a washing machine according to the first embodiment of the present invention when using the washing machine motor of a double stator double rotor structure.

FIG. 6 is a circuit diagram showing a motor driving apparatus for a washing machine according to a first embodiment of the present invention. Referring to FIG. 6, a motor 300 for a washing machine having a double stator 10 includes a number of split cores 60 in which each stator core 60 includes an outer tooth 62 and an inner tooth 64. The first coil 12 of three phases (U-phase, V-phase and W-phase) is sequentially wound on the outer tooth 62, to thus constitute the outer stator 12a, and the second coil 14 of three phases (U-phase, V-phase and W-phase) is sequentially wound on the inner tooth 64, to thus constitute the inner stator 14a.

The first coil 12 of the outer stator 12a includes first three-phase (U-phase, V-phase and W-phase) stator coils 101-1, 101-2, and 101-3, and the second coil 14 of the inner stator 14a includes second three-phase (U-phase, V-phase and W-phase) stator coils 103-1, 103-2, and 103-3.

When three-phase AC power is applied to the first three-phase (U-phase, V-phase and W-phase) stator coils 101-1, 101-2, and 101-3, the outer rotor 20 is driven to rotate. When three-phase AC power is applied to the second three-phase (U-phase, V-phase and W-phase) stator coils 103-1, 103-2, and 103-3, the inner rotor 30 is driven to rotate.

Here, the pulsator rotating shaft 244 is connected to the outer rotor 20, and the dewatering tub rotating shaft 242 is connected to the inner rotor 30.

Accordingly, when three-phase AC power is applied to the first three-phase (U-phase, V-phase and W-phase) stator coils 101-1, 101-2, and 101-3, the outer rotor 20 is driven to rotate and simultaneously the pulsator 230 is rotated. Meanwhile, when three-phase AC power is applied to the second three-phase (U-phase, V-phase and W-phase) stator coils 103-1, 103-2, and 103-3, the inner rotor 30 is driven to rotate, and simultaneously the dewatering tub 220 is rotated.

A reference numeral 110 denotes a motor controller. The motor controller 110 may be implemented by using a microcomputer or controller or a general-purpose signal processor including a CPU (Central Processing Unit), a RAM that temporarily stores internal or external signal processing data of the CPU, and a ROM or PROM that stores system control programs.

The motor controller 110 generates a drive signal for driving the motor 300 for the washing machine according to a control signal of a washing, rinsing, or dewatering mode that is input from an external main body controller (not shown) of the washing machine.

For example, the motor controller 110 generates a three-phase PWM (Pulse Width Modulation) drive signal for driving the motor 300 for the washing machine.

A reference numeral 120 denotes a gate driver. The gate driver 120 amplifies a voltage level of the drive signal generated from the motor controller 110 into a sufficiently high voltage level necessary for driving an inverter.

A reference numeral 130 denotes an inverter. The inverter 130 includes three pairs of switching devices (Q1, Q2), (Q3, Q4) and (Q5, Q6) that perform switching operations of DC power of an electric power source Vcc, depending on the three-phase PWM drive signal that is amplified to have a sufficient voltage level by the gate driver 130. The three pairs of switching devices (Q1, Q2), (Q3, Q4) and (Q5, Q6) are divided into upper switching devices Q1, Q3, and Q5 and lower switching devices Q2, Q4, and Q6 and are respectively connected in a totem pole structure.

In addition, the three-phase (U-phase, V-phase and W-phase) AC power is generated at the junction of each of the three pairs of the switching devices (Q1, Q2), (Q3, Q4) and (Q5, Q6), and the W-phase AC power of the generated three-phase AC power is output to the first W-phase stator coil 101-3 and the second W-phase stator coil 103-3 that are all the W-phase coils.

A reference numeral 140 denotes a switching unit. The switching unit 140 is provided between the U-phase and V-phase outputs of the inverter 130 and all of the first U-phase and V-phase stator coils 101-1 and 101-2 and the second U-phase and V-phase stator coils 103-1 and 103-2 that are the U-phase and V-phase coils of the washing machine motor 300, and performs the switching of the U-phase and V-phase AC power output from the inverter 130 under the control of the motor controller 110, to then be applied to the first U-phase and V-phase stator coils 101-1 and 101-2 or the second U-phase and V-phase stator coils 103-1 and 103-2 selectively.

Figure 7:
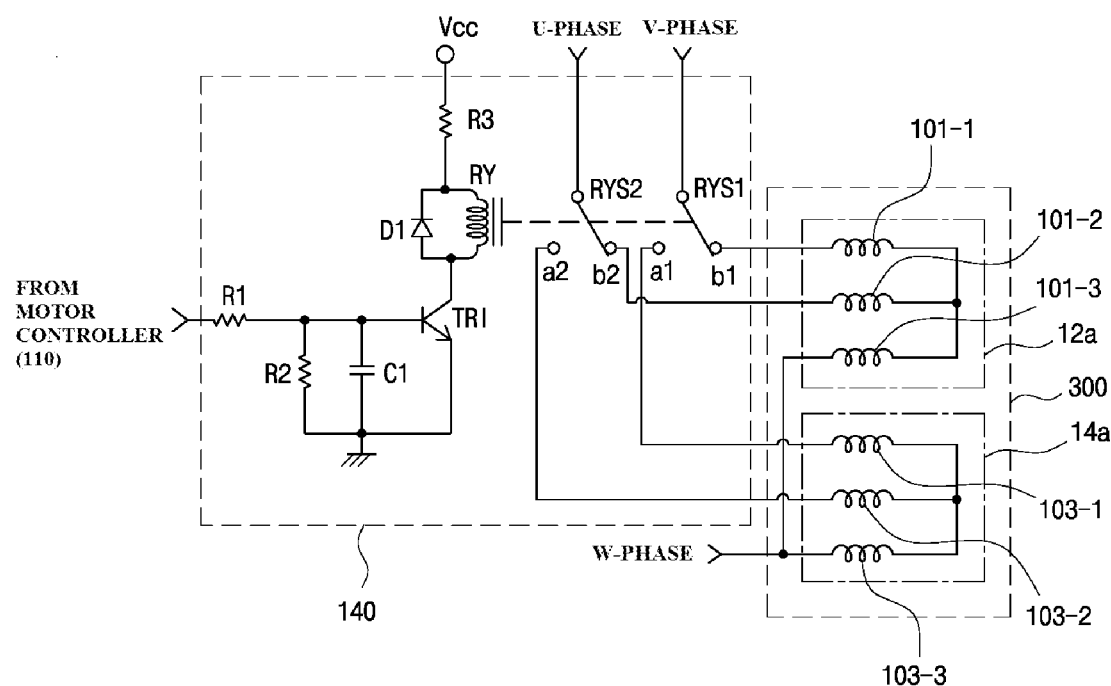
FIG. 7 is a detailed circuit diagram a switching unit in a motor driving apparatus for a washing machine according to the present invention.

As shown in FIG. 7, the switching unit 140 is configured so that the output end of the motor controller 110 is connected to a ground resistance R2, a ground capacitor C1, and the base of a transistor TR1 whose emitter is grounded, via a resistance R1.

In addition, a power supply terminal Vcc is connected to the collector of a transistor TR1 through a resistor R3 and both a relay coil RY and a diode D1 that are connected in parallel with each other.

In addition, the movable terminals of relay switches RYS1 and RYS2 that are switched in accordance with the excitation of the relay coil RY are respectively connected to the output ends of the inverter 130 from which the U-phase and V-phase AC power are output, the one-side fixed terminals a1 and a2 of the relay switches RYS1 and RYS2 are respectively connected to the second U-phase and V-phase stator coils 103-1 and 103-2, and the other-side fixed terminals b1 and b2 of the relay switches RYS1 and RYS2 are respectively connected to the first U-phase and V-phase stator coils 101-1 and 101-2.

The motor driving apparatus for a washing machine configured as described above according to the present invention is activated in a state where operational power has been applied to the power supply terminal Vcc. When a control signal is input to the motor controller 110 from an external controller (not shown), it is determined whether to perform an operation of the washing or rinsing mode, or whether to perform an operation of the dewatering mode from the input control signal.

In the result of the determination, when the operation of the washing or rinsing mode should be performed, the motor controller 110 generates a low potential signal of a logic zero to then be output to the switching unit 140.

As shown in FIG. 7, the switching unit 140 enables the transistor TR1 to be turned off since the low potential signal of the logic zero generated from the motor controller 110 is applied to the base of the transistor TR1 through a resistor R1.

When the transistor TR1 is turned off, the relay coil RY is no longer activated, and the movable terminals of the relay switches RYS1 and RYS2 are each connected to the other side fixed terminals b1 and b2.

In this case, the motor controller 110 generates a three-phase PWM drive signal based on the operation of the washing or rinsing mode, the generated three-phase PWM drive signal is amplified in the gate driver 120 to then be applied to the gates of the switching devices Q1~Q6 of the inverter 130. Accordingly, the switching devices Q1~Q6 of the inverter 130 are switched according to the three-phase PWM drive signal.

Here, the inverter 130 is configured so that the PWM drive signal is applied to one gate of the upper switching devices Q1, Q3, and Q5 and one gate of the lower switching devices Q2, Q4, and Q6, according to detection of the rotor position of the Hall devices. In this case, the inverter 130 may be driven in a manner that when a U-phase upper switching device Q1 among the upper switching devices Q1, Q3, and Q5 is turned on depending on detection of the rotor position of the Hall device, for example, at 0°, a W-phase lower switching device Q6 is turned on. That is, the inverter 130 may be driven in a 6-step mode.

In addition, the PWM drive signals that are applied to the gates of the upper switching devices Q1, Q3, and Q5, have a phase difference of 120° or 180° from one another.

Therefore, the switching devices Q1 to Q6 of the inverter 130 are alternately turned on and turned off according to the PWM drive signal that has been amplified in the gate driver 120, to thus perform a switching operation of the DC power of the power supply terminal Vcc and generate three-phase (U-phase, V-phase, and W-phase) AC power from connection points to then be output to the washing machine motor 300.

In this case, the W-phase AC power of the three-phase AC power generated from the inverter 130 is output to the first W-phase stator coil 101-3 and the second W-phase stator coil 103-3 that are the W-phase coil of the washing machine motor 300.

In this case, as described above, since the switching unit 140 enables the movable terminals of the relay switches RYS1 and RYS2 to be connected to the other-side fixed terminals b1 and b2, respectively, at the washing or rinsing mode, the U-phase and V-phase AC powers of the three-phase AC power generated from the inverter 130 are applied to the first U-phase and V-phase stator coils 101-1 and 101-2 via the relay switches RYS1 and RYS2.

Therefore, the two phases of the three-phase (U-phase, V-phase, and W-phase) AC power generated from the inverter 130 are alternately applied to the first U-phase, V-phase, and W-phase stator coils 101-1, 101-2, and 101-3 according to the 6-step mode. Accordingly, the outer rotor 20 is rotated to thus rotate the pulsator 230 to thereby perform the washing and rinsing operations of laundry.

Here, in the case of performing the washing and rinsing operations of laundry, the pulsator 230 is repeatedly rotated in the forward or reverse direction.

The motor controller 110 may control the order of generating a three-phase PWM drive signal to thus make the pulsator 230 repeatedly rotated in the forward or reverse direction.

Meanwhile, in the result of the determination, when the operation of the dewatering mode is performed, the motor controller 110 generates a high potential signal of a logic one to then be output to the switching unit 140.

The switching unit 140 enables the transistor TR1 to be turned on since the high potential signal of the logic one generated from the motor controller 110 is applied to the base of the transistor TR1 via the resistor R1.

When the transistor TR1 is turned on, the operating power of the power supply terminal Vcc flows to the transistor TR1 through the resistor R3 and the relay coil RY, so the relay coil RY is activated to thus generate a magnetic field, the movable terminals of the relay switches RYS1 and RYS2 are respectively connected to the one-side fixed terminals a1 and a2 by the generated magnetic field.

In such a state, the motor controller 110 generates a three-phase PWM drive signal in accordance with the operation of the dewatering mode, the generated three-phase PWM drive signal is amplified by the gate driver 120, to then be applied to the gates of the switching devices Q1~Q6 of the inverter 130 according to the 6-step mode. Thus, the switching devices Q1~Q6 of the inverter 130 are alternately switched in a pattern of a pair of switching devices by a pair of switching devices according to the three-phase PWM drive signal, to thus perform a switching of the DC power of the power supply terminal Vcc and then generate the three-phase (U-phase, V-phase and W-phase) AC power.

The W-phase AC power of the three-phase AC power generated from the inverter 130 is directly output to the first W-phase stator coil 101-3 and the second W-phase stator coil 103-3 that are the W-phase coil of the washing machine motor 300.

In this case, as described above, since the switching unit 140 enables the movable terminals of the relay switches RYS1 and RYS2 to be connected to the one-side fixed terminals a1 and a2, respectively, at the dewatering mode, the U-phase and V-phase AC powers of the three-phase AC power generated from the inverter 130 are applied to the second U-phase and V-phase stator coils 103-1 and 103-2 via the relay switches RYS1 and RYS2.

Therefore, the two phases of the three-phase (U-phase, V-phase, and W-phase) AC power generated from the inverter 130 are sequentially applied to the second U-phase, V-phase, and W-phase stator coils 103-1, 103-2, and 103-3 according to the 6-step mode. Accordingly, the inner rotor 30 is rotated to thus rotate the dewatering tub 220 to thereby perform the dewatering operation of laundry, according to the three-phase AC power generated from the inverter 130.

Figure 8:
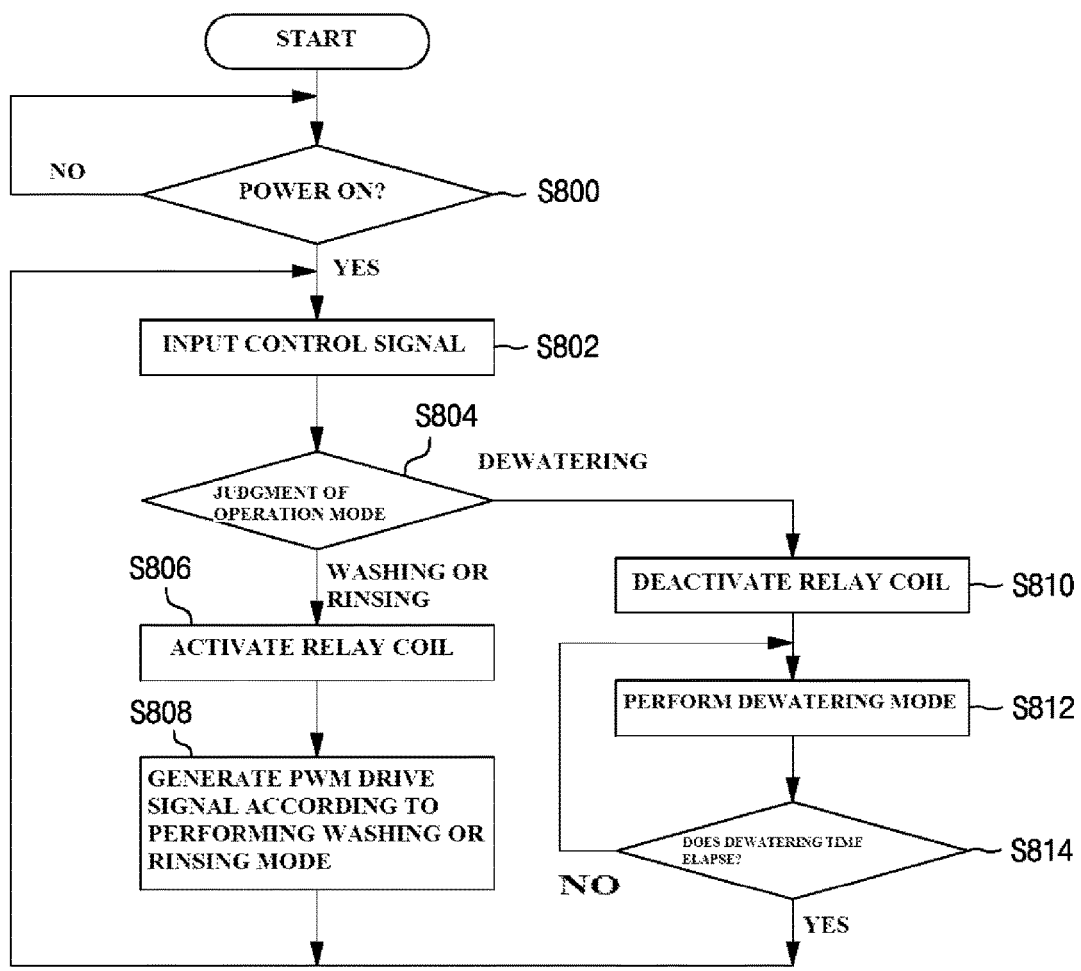
FIG. 8 is a flowchart showing operation of a motor controller according to a driving method of the present invention.

FIG. 8 is a flowchart showing the operation of the motor controller according to the driving method of the present invention. Referring to FIG. 8, the motor controller 110 determines whether or not the power is turned on (S800).

When the power is turned on, the motor controller 110 inputs a control signal from an external control unit (S802). It is determined whether to perform an operation of the washing or rinsing mode, or whether to perform an operation of the dewatering mode according to the input control signal (S804).

In the result of the determination, when the operation of the washing or rinsing mode is performed, the motor controller 110 generates a low potential signal of a logic zero to thus deactivate the relay coil RY of the switching unit 140 (S806).

Then, the movable terminals of the relay switches RYS1 and RYS2 are respectively connected to the other-side fixed terminals b1 and b2.

In such a state, the motor controller 110 generates the three-phase PWM drive signal in accordance with the operation of the washing or rinsing mode (S808).

The generated three-phase PWM drive signal is amplified by the gate driver 120, and the switching devices Q1~Q6 of the inverter 130 are alternately switched one pair of switching devices after another pair of switching devices to thus generate the two-phase (U-phase and V-phase) AC power of the three-phase AC power. The generated U-phase and V-phase AC power of the three-phase (U-phase, V-phase and W-phase) AC power is applied to the first U-phase and V-phase stator coils 101-1 and 101-2, through the relay switches RYS1 and RYS2, and the W-phase AC power of the three-phase (U-phase, V-phase and W-phase) AC power is directly applied to the first W-phase stator coil 101-3, to thus make the outer rotor 20 rotate, and make the pulsator 230 rotate, to thereby perform the washing and rinsing operations of laundry.

When the dewatering mode is performed (S804), the motor controller 110 generates a high potential signal of a logic one to thus drive the relay coil RY of the switching unit 140 (S810).

Then, the movable terminals of the relay switches RYS1 and RYS2 are connected to the one-side fixed terminals a1 and a2, respectively.

In this state, the motor controller 110 generates the three-phase PWM drive signal and performs operation of the dewatering mode (S812).

That is, the three-phase PWM drive signal generated by the motor controller 110 is amplified in the gate driver 120, and the switching devices Q1~Q6 of the inverter 130 are alternately switched one pair of switching devices after another pair of switching devices to thus generate the two-phase (U-phase and V-phase) AC power of the three-phase AC power. The generated U-phase and V-phase AC power of the three-phase (U-phase, V-phase and W-phase) AC power is applied to the second U-phase and V-phase stator coils 103-1 and 103-2, and the W-phase AC power of the three-phase (U-phase, V-phase and W-phase) AC power is directly applied to the second W-phase stator coil 103-3, to thus make the inner rotor 30 rotate, and make the dewatering tub 220 rotate, to thereby perform the dewatering operation of laundry.

In this state, the motor controller 110 determines whether or not a preset dewatering time elapses (S814).

In the result of the determination, when the preset dewatering time has not been elapsed, the motor controller 110 returns to a step (S812) of performing operation of the dewatering mode, to thus perform the operation of the dewatering mode and repeats the operation of determining whether or not the preset dewatering time has elapsed.

In the case that the predetermined dewatering time elapses, the operation of the dewatering mode ends, and returns to a step (S802) of receiving a control signal from an external controller, to thus repeatedly perform operation of receiving the control signal from the external controller.

In the above embodiment, the motor driving device of the first embodiment drives a motor of a double stator-double rotor structure in which the first and second coils 12 and 14 are respectively wound on the outer tooth 62 and the inner tooth 64 of the split core 60, to thus integrally form the outer stator 12*a* and the inner stator 14*a*, and the outer rotor 20 and the inner rotor 30 are disposed in opposition to the outer stator 12*a* and the inner stator 14*a*, respectively. However, as shown in FIG. 9, it is also possible to drive at least two independent separate first and second motors 301 and 303.

Figure 9:
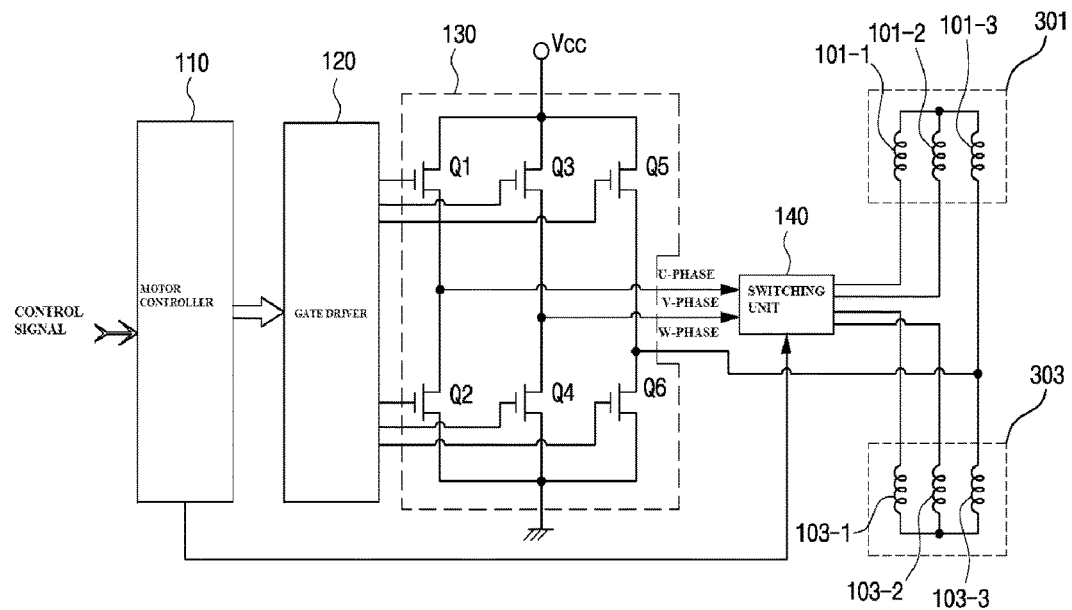
FIG. 9 is a block diagram showing a circuit configuration of a motor driving apparatus for a washing machine according to a modified embodiment of the invention using a separate multi-motor.

Referring to FIG. 9, a motor driving apparatus according to a modified embodiment of the present invention can selectively drive a multi-motor including a first motor 301 having a first stator and a first rotor and a second motor 303 having a second stator and a second rotor in which the first motor 301 is separated from the second motor 303, instead of the washing machine motor 300 of a double stator-double rotor structure shown in FIGS. 1 to 5.

The first and second motors 301 and 303 may employ a BLDC (brushless direct-current) motor of any motor structure if the first stator includes three-phase (U-phase, V-phase, and W-phase) first stator coils 101-1, 101-2, and 101-3 and the second stator includes three-phase (U-phase, V-phase, and W-phase) second stator coils 103-1, 103-2, and 103-3.

The first and second U-phase and V-phase stator coils 101-1, 101-2, 103-1, and 103-2 are connected to the inverter 130 through the switching unit 140, and the first and second W-phase stator coils 101-3, and 103-3 are commonly connected and may be connected directly to the inverter 130.

The first and second motors 301 and 303 can employ different motor characteristics, and the motors controlled by the motor driving apparatus can employ a multi-motor using two or more motors, to accordingly increase the number of the relay switches of the relay devices used in the switching unit 140.

The motor driving apparatus according to a modified embodiment shown in FIG. 9 operates in the same manner as in the motor driving apparatus of the first embodiment and therefore the explanation thereof will be omitted.

In addition, in FIG. 9, the case that two motors are driven by using one inverter has been illustrated, but, after a number of motors are connected via the switching unit, and one of the number of motors is sequentially designated by controlling the switching unit by the motor controller, or one of the number of motors selected according to a control signal transmitted from a main body to which and the motor driving apparatus is applied is designated, it is of course possible to apply an output of the inverter to the designated motor.

The washing machine motor driving apparatus according to the first embodiment has a power transmission structure in which the outer rotor 20 and the inner rotor 30 of a double stator-double rotor structure motor 300 are each directly connected to the pulsator 230 and the dewatering tub 220 via the pulsator rotating shaft 244 and the dewatering tub rotating shaft 242, to thus transmit the rotational force.

A large-capacity washing machine of 8 Kg or more requires a large torque in a washing mode, but the power transmission structure which connects the motor directly to the pulsator with no torque conversion using the planetary gear unit causes lowering of the efficiency and an increase in the current density, to thus cause a problem that the temperature rises.

The washing machine motor driving apparatus according to the second embodiment which will be described below is configured to make one output of dual outputs of the double rotor connected to the pulsator via an inner shaft of a planetary gear unit, and to make the other output of the dual outputs of the double rotor connected to the dewatering tub via a case (or a ring gear) of the planetary gear unit, to thereby solve a torque shortage phenomenon in a large-capacity washing machine.

A washing machine to which the washing machine motor driving apparatus according to the second embodiment of the present invention is applied will be described referring to FIGS. 10 to 12.

Figure 10:
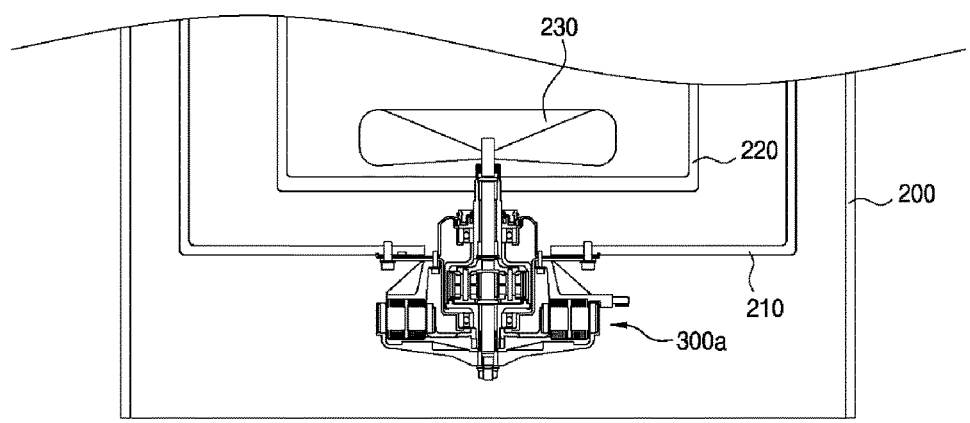
FIG. 10 is a cross-sectional view of a washing machine in which a motor driving apparatus for the washing machine according to a second embodiment of the present invention is applied.
Figure 11:
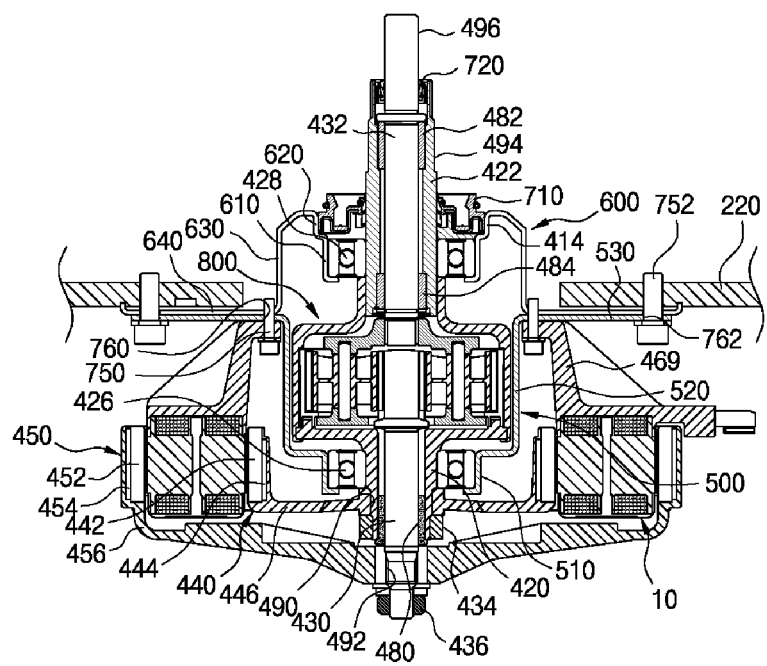
FIG. 11 is a cross-sectional view of a washing machine motor in which a washing machine motor driving apparatus is applied according to the second embodiment of the present invention.

First, referring to FIGS. 10 and 11, the washing machine includes: a case 200 forming an outer appearance; a washing tub 210 which is disposed in an inside of the case 200 for receiving washing water; a dewatering tub 220 which is rotatably disposed inside the washing tub 210 to perform washing and dewatering; a pulsator 230 which is rotatably disposed inside the dewatering tub 220 to form a washing water flow; and a motor 300*a* which is mounted on a lower portion of the dewatering tub 220, to drive the dewatering tub 220 and the pulsator 230 selectively.

As shown in FIG. 11, the motor 300*a* includes: outer shafts 420 and 422 which are connected with the dewatering tub 220; inner shafts 430 and 432 which are rotatably arranged inside the outer shafts 420 and 422 and connected with the pulsator 230; an inner rotor 40 which is connected with the outer shafts 420 and 422; an outer rotor 450 which is connected to the inner shafts 430 and 432; a stator 10 which is disposed with an air gap between the inner rotor 440 and the outer rotor 450, and a planetary gear unit 800 which are provided in the inner shafts 430 and 432 to slow down the rotational speeds of the inner shafts 430 and 432 to thus increase torques of the inner shafts 430 and 432.

The stator 10 which is applied to the motor 300*a* can be used in the double stator shown in FIGS. 3 to 5. Accordingly, the description of the stator 10 will be omitted.

Here, in the case that the pulsator 230 is connected to the outer shafts 420 and 422, the planetary gear unit 800 is mounted on the outer shafts 420 and 422 to thus slow down the rotational speeds of the outer shafts 420 and 422.

The outer shafts 420 and 422 are formed in a cylindrical form so that the inner shafts 430 and 432 pass through the outer shafts 420 and 422, and include: a first outer shaft 4202 connected to the inner rotor 440; and a second outer shaft 422 connected to the dewatering tub 120.

Then, the inner shafts 430 and 432 include: a first inner shaft 430 coupled to the outer rotor 450; and a second inner shaft 432 connected to the pulsator 230.

Figure 12:
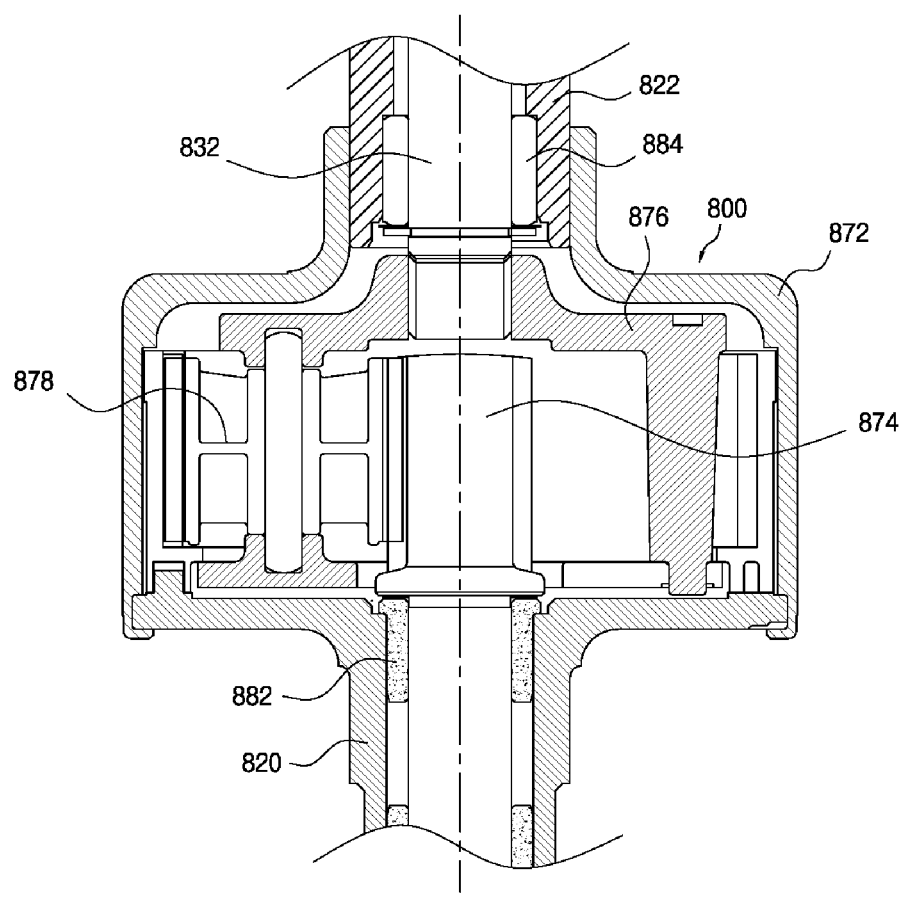
FIG. 12 is a cross-sectional view of a planetary gear unit according to the second embodiment of the present invention.

As shown in FIG. 12, the planetary gear unit 800 includes: a ring gear 872 connecting between the first outer shaft 420 and the second outer shaft 422; a sun gear 874 integrally connected to the first inner shaft 430; a plurality of planetary gears 878 that are gear-engaged on an outer surface of the sun gear 874 and an inner surface of the ring gear 872; and a carrier 876 to which the planetary gears 878 are rotatably supported and that is coupled to the second inner shaft 432.

The planetary gear unit 800 is configured so that the first outer shaft 420 and the second outer shaft 422 are connected with each other by the ring gear 872 to thus enable the rotational speed of the first outer shaft 420 to be transmitted to the second outer shaft 422. Therefore, the rotational speed of the first outer shaft 420 is the same as that of the second outer shaft 422.

The first inner shaft 430 is formed integrally with the sun gear 874, the second inner shaft 432 is connected with the carrier 876 by spline coupling, and the carrier 876 is rotatably supported at the center of the plurality of the planetary gears 878. Therefore, the rotational speed of the first inner shaft 430 is transmitted to the second inner shaft 432 through the sun gear 874, the planetary gears 878 and the carrier 876, to thereby achieve a deceleration.

In this way, the first and the second inner shafts 430 and 432 are connected with each other by the planetary gear unit 800, to thus increase torque as the rotational speed of the outer rotor 450 is decelerated and transmit the increased torque to the pulsator 230, to thereby increase the torque of the pulsator 230, and to thus be applicable to a large-capacity washing machine.

A first connection portion 490 is formed on an outer surface of the first outer shaft 420, in which an inner rotor support 446 of the inner rotor 440 is connected to the first connection portion 490, and a second connection portion 492 is formed on a lower end of the first inner shaft 430, in which an outer rotor support 456 of the outer rotor 450 is connected to the second connection portion 492.

A third connection portion 494 is formed on an outer surface of an upper end of the second outer shaft 422, in which the dewatering tub 220 is connected to the third connection portion 494, and a fourth connection portion 496 is formed on an outer surface of an upper end of the second inner shaft 432, in which the pulsator 230 is connected to the fourth connection portion 496.

The first connecting portion 490, the second connection portion 492, the third connection portion 494 and the fourth connection portion 496 may be coupled by serration coupling or spline coupling through respective protrusions formed on the outer surfaces of the first outer shaft 420, the second outer shaft 422, the first inner shaft 430, and the second inner shaft 432, or by mutual key coupling through respective key grooves formed on the outer surfaces of the first outer shaft 420, the second outer shaft 422, the first inner shaft 430, and the second inner shaft 432.

A first fixing nut 434 that prevents the inner rotor support 446 of the inner rotor 440 from seceding from the first outer shaft 420 is screwed at the lower end of the first outer shaft 420, and a second fixing nut 436 that prevents the outer rotor support 456 of the outer rotor 450 from seceding from the second inner shaft 430 is screwed at the lower end of the second inner shaft 430.

A first sleeve bearing 480 and a second sleeve bearing 482 are provided on the upper and lower inner surfaces of the first outer shaft 420, to thus rotatably support the first inner shaft 430, and a third bearing sleeve 484 and a fourth sleeve bearing 486 are provided on the upper and lower inner surfaces of the second outer shaft 422, to thus rotatably support the second inner shaft 432.

A first seal 720 is mounted between the second outer shaft 422 and the second inner shaft 432 to prevent the washing water from leaking, and a second seal 710 is mounted between the second outer shaft 422 and the second bearing housing 600 to prevent the washing water from leaking.

A first bearing 426 is disposed on the outer surface of the first outer shaft 420 to thus rotatably support the first outer shaft 420, and a second bearing 428 is disposed on the outer surface of the second outer shaft 422 to thus rotatably support the second outer shaft 422.

The first bearing 426 is seated in a first bearing housing 500 and the second bearing 428 is seated in the second bearing housing 600.

The first bearing housing 500 is formed of a metallic material, and includes: a first bearing mounting portion 510 in which the first bearing 426 is seated; a cover portion 520 that is externally extended from the first bearing mounting portion 510 to thus form a cylindrical shape, and that is disposed to be wrapped with a certain gap on the outer surface of the planetary gear unit 800, to thus protect the planetary gear unit 800; and a flat plate portion 530 that is externally extended from the top of the cover portion 520 to thus form a circular plate shape, and on which the stator 10 and the dewatering tub 220 are fixed.

A plurality of first fastening holes 760 are formed in the inside of the flat plate portion 530 in the circumferential direction thereof in which the stator 10 is coupled with the flat plate portion 530 when bolts 750 are engaged into the first fastening holes 760, and a plurality of second fastening holes 762 are formed in the outside of the flat plate portion 530 in the circumferential direction thereof in which the dewatering tub 220 is coupled with the flat plate portion 530 when bolts 752 are engaged into the second fastening holes 762.

The second bearing housing 600 is formed of a metallic material, and includes: a second bearing mounting portion 610 on which the second bearing 428 is mounted; a second seal fixing portion 620 that is externally extended from the second bearing mounting portion 610 and on which a second seal 710 is fixed; a connection portion 630 that is bent downwards from the second seal fixing portion 620, to thus form a cylindrical shape; and a flat plate portion 640 that is externally extended from the bottom of the connection portion 630 and is fixed to the dewatering tub 220.

A plurality of third fastening holes are formed in the inside of the flat plate portion 640 in the circumferential direction thereof in which the stator 10 is coupled with the flat plate portion 530 when bolts 750 are engaged into the third fastening holes in communication with the first fastening holes 760, and a plurality of fourth fastening holes are formed in the outside of the flat plate portion 640 in the circumferential direction thereof in which the dewatering tub 220 is coupled with the flat plate portion 530 when bolts 752 are engaged into the fourth fastening holes in communication with the second fastening holes 762.

Here, the flat plate portion 530 of the first bearing housing 500 and the plate portion 640 of the second bearing housing 600 are overlapped with each other, to thus enhance the fastening strength between the stator 10 and the dewatering tub 220.

The inner rotor 440 includes: a first magnet 442 which is arranged with a certain gap on the inner surface of the stator 10; a first back yoke 444 which is disposed on the rear surface of the first magnet 442; and an inner rotor support 446 which is formed integrally with the first magnet 442 and the first back yoke 444 by insert molding.

Here, the inner rotor support 446 is molded with a BMC (Bulk Molding Compound) molding material such as a thermosetting resin, for example, polyester, and is integrally formed with the first magnet 442 and the first back yoke 444. Therefore, the inner rotor 440 may have a waterproof function, and shorten a manufacturing process.

The inner rotor support 446 is formed of a disc shape with a central opening portion, in which the inner surface of the inner rotor support 446 is connected to the first connecting portion 490 of the first outer shaft 420 to thus be rotated as the first outer shaft 420, and the outer surface of the inner rotor support 446 is integrally formed with the first magnet 442 and the first back yoke 444.

In addition, the outer rotor 450 includes: a second magnet 452 which is disposed with a predetermined gap on the outer surface of the stator 10; a second back yoke 454 which is disposed on the rear surface of the second magnet 452; and an outer rotor support 456 which is formed integrally with the second magnet 452 and the second back yoke 454 by insert molding.

Here, the outer rotor support 456 is molded with a BMC (Bulk Molding Compound) molding material such as a thermosetting resin, for example, polyester, and is integrally formed with the second magnet 452 and the second back yoke 454. Therefore, the outer rotor 450 may have a waterproof function, and shorten a manufacturing process.

The outer rotor support 456 is formed of a disc shape with a central opening portion, in which the inner surface of the outer rotor support 456 is connected to the second connecting portion 492 of the first inner shaft 430 to thus be rotated as the first inner shaft 430, and the outer surface of the outer rotor support 456 is integrally formed with the second magnet 452 and the second back yoke 454.

The operation of the washing machine using the washing machine motor driving apparatus according to the second embodiment will now be described in detail.

First, when only the pulsator 230 is driven during the washing and rinsing, the motor controller 110 generates a first driving signal, the gate driver 120 amplifies the first driving signal, and the inverter 130 generates the three-phase (U-phase, V-phase, and W-phase) AC power. Then, when the low potential signal of the logic zero is applied to the switching unit 140 from the motor controller 110, the U-phase and V-phase AC power of the three-phase (U-phase, V-phase and W-phase) AC power is applied to the first U-phase and V-phase stator coils 101-1 and 101-2, through the switching unit 140, and the W-phase AC power of the three-phase (U-phase, V-phase and W-phase) AC power is directly applied to the first W-phase stator coil 101-3 without passing through the switching unit 140.

As a result, the outer rotor 450 is driven and rotated by the outer stator 12a, and the first inner shaft 430 that is connected to the outer rotor 450 is rotated. Then, the rotational speed of the first inner shaft 430 is decelerated by the planetary gear unit 800 connected with the first inner shaft 430 to then be transmitted to the second inner shaft 432, and to rotate the pulsator 230 connected to the second inner shaft 432.

In this case, when the gear ratio of the planetary gear unit 800 is set to, for example, 5:1, and thus the rotational speed of the outer rotor 450 is decelerated, the torque is made into a 5-fold increase.

In this way, since the rotational speed of the pulsator 230 is decelerated by the planetary gear unit 800 and the torque is increased, washing is efficiently performed to thus make the motor driving apparatus and method applicable to the large-capacity washing machine.

In addition, during the dewatering, the motor controller 110 generates a second driving signal, the gate driver 120 amplifies the second driving signal, and the inverter 130 generates the three-phase (U-phase, V-phase, and W-phase) AC power. Then, when the high potential signal of the logic one is applied to the switching unit 140 from the motor controller 110, the U-phase and V-phase AC power of the three-phase (U-phase, V-phase and W-phase) AC power is applied to the second U-phase and V-phase stator coils 103-1 and 103-2, through the switching unit 140, and the W-phase AC power of the three-phase (U-phase, V-phase and W-phase) AC power is directly applied to the second W-phase stator coil 103-3 without passing through the switching unit 140.

As a result, the inner rotor 440 is driven and rotated by the inner stator 14a, and the outer shaft 420 that is connected to the inner rotor 440 is rotated. In addition, the ring gear 872 of the planetary gear unit 800 connected to the outer shaft 420 and the dewatering tub 220 connected to the ring gear 872 are also made to rotate. In this case, the rotational speed of the inner rotor 440 is transmitted to the dewatering tub 220 without deceleration and is rotated at the same speed as the inner rotor 440.

As described above, the washing machine motor driving apparatus according to the second embodiment is configured so that the rotational force generated from the outer rotor 420 of the double stator-double rotor structure motor 300a is connected to the pulsator through the planetary gear of the planetary gear unit at the washing and rinsing mode, and the rotational force generated from the inner rotor 430 of the double stator-double rotor structure motor 300a is connected to the dewatering tub through the case of the planetary gear unit at the dewatering mode, to thereby solve a torque shortage phenomenon in a large-capacity washing machine at the washing and rinsing mode.

In the present invention, without using a separate clutch mechanism, it is possible to drive the large-capacity washing machine by using a single inverter in which a planetary gear unit is combined with a washing machine having a double stator-double rotor structure, to thereby implement the structure and control simply.

In the embodiment described, the case of constituting the switching unit by using the relay devices has been described, but the switching unit may be configured by using a plurality of switching transistors.

Further, in the embodiment described, the configuration of switching the U-phase and the V-phase of the U-phase, V-phase, and W-phase from the switching unit and connecting the W-phase directly connected in common to the first and second W-phase stator coils has been described, but it is possible to configure the washing machine motor driving apparatus to perform switching any two phases among three phases and directly connecting the remaining one phase to a stator coil.

As described above, the washing machine motor driving apparatus according to the present invention drives the washing machine motor having a double stator and a double rotor selectively by using a single inverter without using a separate clutch, to thereby reduce production costs.

In addition, in the present invention, the switching unit 140 does not perform switching of the whole three phases and performs a switching control of only two phases, to thus configure the remaining one phase to be applied in common to a stator coil as the inverter output. Accordingly, the relay devices used in the switching unit can employ two consecutive relay switches instead of using three consecutive relay switches of three times a rated capacity, to thereby adopt low-cost relay devices.

Furthermore, a multi-motor can be controlled by using a single inverter to thus minimize the number of heat sinks for the inverter as well as the number of the inverter, and to also minimize the number of wire strands of the wire harness required to connect the multiple inverter and the multi-motor to thereby save the cost and minimize the size.

In the embodiment described, the case that the switching unit of the three-phase motor driving apparatus employs the two consecutive relay switches to perform switching of only two phase outputs among the three phase outputs to then be applied to any one of two motors and applying the remaining one phase output to the two motors without performing switching has been described, but the present invention is not limited thereto. In other words, it is of course possible to configure the switching unit to perform switching of all three phases to output all three phases.

The present invention can be applied to a motor driving apparatus that selectively drive a plurality of independent separate motors as well as a washing machine motor of a double rotor-double stator structure that can rotate a pulsator and a dewatering tub selectively without using a separate clutch.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

What is claimed is:

1. A motor driving apparatus for a washing machine, in which a motor is a washing machine motor with a double stator and a double rotor respectively having first and second U-phase, V-phase, and W-phase stator coils, the washing machine motor driving apparatus comprising:
    a motor controller for generating a drive signal in accordance with a washing mode, a rinsing mode and a dewatering mode, thereby controlling the driving of the motor for the washing machine;
    an inverter for generating a three-phase alternating-current (AC) power according to the drive signal, in which any one-phase AC power of the three-phase AC power is applied in common to any one-phase stator coil of the first and second U-phase, V-phase, and W-phase stator coils for the washing machine motor; and
    a switching unit for switching to apply the remaining two-phase AC power of the three-phase AC power to any two-phase stator coils of the remaining two-phase stator coils of the first and second U-phase, V-phase, and W-phase stator coils for the washing machine motor, according to the control of the motor controller.

2. The washing machine motor driving apparatus according to claim 1, wherein the switching unit comprises:
    a transistor that is switched according to the control of the motor controller;
    a relay coil that is activated or deactivated depending on the switching of the transistor; and
    a relay switch for switching to apply the two-phase AC power to the two-phase stator coils of the first U-phase, V-phase, and W-phase stator coils for the washing machine motor, or the two-phase stator coils of the second U-phase, V-phase, and W-phase stator coils for the washing machine motor, depending on the activation or deactivation of the relay coil.

3. The washing machine motor driving apparatus according to claim 1, wherein the double rotor comprises:
    an inner rotor that is connected to a dewatering tub rotary shaft for driving a dewatering tub and is rotated together; and
    an outer rotor that is connected to a pulsator rotating shaft for driving a pulsator and that is rotated together, and
    wherein the double stator that is arranged with an air gap from each of the inner rotor and the outer rotor between the inner rotor and the outer rotor comprises:
    an outer stator including first U-phase, V-phase, and W-phase stator coils that interact with the outer rotor to thus form a first outer magnetic circuit; and
    an inner stator including second U-phase, V-phase, and W-phase stator coils that interact with the inner rotor to thus form a second outer magnetic circuit.

4. The washing machine motor driving apparatus according to claim 3, wherein, in the event of generating washing and rinsing mode drive signals from the motor controller, the switching unit switches to apply the two-phase AC power of the three-phase AC power to the two-phase stator coils of the first U-phase, V-phase, and W-phase stator coils, and
    wherein, in the event of generating a dewatering mode drive signal from the motor controller, the switching unit switches to apply the two-phase AC power of the three-phase AC power to the two-phase stator coils of the second U-phase, V-phase, and W-phase stator coils.

5. The washing machine motor driving apparatus according to claim 3, wherein the double stator comprises a plurality of split core assemblies, wherein each of the plurality of split core assemblies comprises:
    a split core in which outer teeth are formed on an outer side of the split core, and inner teeth are formed on an inner side thereof, and that is assembled with adjacent split cores by a back yoke connecting the outer teeth and the inner teeth in an annular form;
    an insulator bobbin surrounding the outer surface of the split core;
    first U-phase, V-phase, and W-phase stator coils wound on the outer teeth; and
    second U-phase, V-phase, and W-phase stator coils wound on the inner teeth.

6. The washing machine motor driving apparatus according to claim 1, wherein the washing machine motor comprises:
    the double rotor having an inner rotor and an outer rotor; and
    the double stator with an air gap disposed from each of the inner rotor and the outer rotor between the inner rotor and the outer rotor,
    the washing machine motor driving device further comprising a planetary gear unit that reduces the rotational speed of the outer rotor and transmits the reduced rotational speed of the outer rotor to the pulsator at the washing and rinsing modes, and transmits the rotational speed of the inner rotor to the dewatering tub at the dewatering mode without reducing the rotational speed of the inner rotor.

7. The washing machine motor driving apparatus according to claim 6, further comprising:
    a first inner shaft for transmitting the rotational force of the outer rotor to a sun gear of the planetary gear unit;

a first outer shaft for transmitting the rotational force of the inner rotor to a ring gear of the planetary gear unit;

a second inner shaft for transmitting the output of a carrier of the planetary gear unit to the pulsator; and a second outer shaft for transmitting the output of the ring gear of the planetary gear unit to the dewatering tub.

8. The washing machine motor driving apparatus according to claim 6, wherein the planetary gear unit comprises:

a ring gear connecting between a first outer shaft and a second outer shaft;

a sun gear connected to the first inner shaft;

a plurality of planetary gears that are engaged with an outer surface of the sun gear and an inner surface of the ring gear; and a carrier to which the planetary gears are rotatably supported and that is connected to the second inner shaft.

9. The washing machine motor driving apparatus according to claim 7, wherein a first bearing is supported on the outer surface of the first outer shaft and a second bearing is supported on the outer surface of the second outer shaft, wherein the first bearing is fixed to a first bearing housing and the second bearing is fixed to a second bearing housing.

10. The washing machine motor driving apparatus according to claim 9, wherein the first bearing housing comprises:

a first bearing mounting portion on which the first bearing is mounted;

a cover portion that is externally extended from the first bearing mounting portion to thus form a cylindrical shape, and that is disposed to be wrapped with a certain gap on the outer surface of the planetary gear unit, to thus protect the planetary gear unit; and a first flat plate portion that is externally extended from the top of the cover portion to thus form a circular plate shape, and on which the double stator and the dewatering tub are fixed.

11. The washing machine motor driving apparatus according to claim 9, wherein the second bearing housing comprises:

a second bearing mounting portion on which the second bearing is mounted;

a second seal fixing portion that is externally extended from the second bearing mounting portion and on which a second seal is fixed;

a connection portion that is bent downwards from the second seal fixing portion, to thus form a cylindrical shape; and a second flat plate portion that is externally extended from the bottom of the connection portion and is overlapped with the first flat plate portion.

12. A method of driving a motor for a washing machine, the washing machine motor comprising a double stator and a double rotor respectively having first and second U-phase, V-phase, and W-phase stator coils, the motor driving method comprising the steps of:

judging an operation mode based on a control signal by a motor controller;

controlling a three-phase alternating-current (AC) power generated from an inverter to be output to the first U-phase, V-phase, and W-phase stator coils in the case that the judged operation mode is a washing mode or rinsing mode, to thus make an outer rotor of the double rotor rotated to thereby make a pulsator rotated; and controlling the three-phase AC power generated from the inverter to be output to the second U-phase, V-phase, and W-phase stator coils in the case that the judged operation mode is a dewatering mode, to thus make an inner rotor of the double rotor rotated to thereby make a dewatering tub rotated.

13. The motor driving method of claim 12, wherein the motor controller controls a switching unit to apply the two-phase AC power of the three-phase AC power to one selected from the first and second U-phase, V-phase, and W-phase stator coils, when the three-phase alternating-current (AC) power generated from the inverter is selectively applied to one selected from the first and second U-phase, V-phase, and W-phase stator coils.

14. The motor driving method of claim 12, wherein the step of making an inner rotor of the double rotor rotated to thereby make a dewatering tub rotated, further comprises the step of transmitting the rotational speed of the inner rotor to the dewatering tub without speed reduction through a ring gear of a planetary gear unit.

15. The motor driving method of claim 12, wherein the step of making an outer rotor of the double rotor rotated to thereby make a pulsator rotated, further comprises the step of transmitting the rotational speed of the outer rotor to the pulsator with speed reduction through the planetary gear unit.

* * * * *